United States Patent [19]

Otto

[11] 4,010,986
[45] Mar. 8, 1977

[54] BEARING ARRANGEMENT FOR A VEHICLE WHEEL

[75] Inventor: Heinz Otto, Wolfsburg, Germany

[73] Assignee: Volkswagenwerk Aktiengesellschaft, Wolfsburg, Germany

[22] Filed: Dec. 31, 1975

[21] Appl. No.: 645,796

[30] Foreign Application Priority Data

Feb. 7, 1975 Germany .......................... 2505081

[52] U.S. Cl. .................................. 308/16; 301/6 E; 308/189 R
[51] Int. Cl.² .......................................... F16C 13/00
[58] Field of Search .................... 301/6 R, 6 E, 12; 308/16, 188, 189 R; 277/53, DIG. 4

[56] References Cited

UNITED STATES PATENTS 3,597,000  8/1971  Klaue .............................. 301/6 E

FOREIGN PATENTS OR APPLICATIONS 669,072  10/1935  Germany .......................... 301/6 E
7,133,830  8/1973  Germany .......................... 301/6 E
1,915,932  1/1969  Germany .......................... 301/6 E
1,902,942  8/1969  Germany .......................... 301/6 E

*Primary Examiner*—Joseph F. Peters
*Assistant Examiner*—Gene A. Church
*Attorney, Agent, or Firm*—Brumbaugh, Graves, Donohue & Raymond

[57] ABSTRACT

A bearing arrangement for a vehicle wheel, particularly of an automobile, has an outer component provided with a bore and an inner axle component journalled in the bore and supported therein by means of a bearing. One of the components is connected to a wheel for the vehicle and the other component is connected to wheel guiding elements articulated on the vehicle body. The exterior surfaces of the components in the vicinity of the bore define a gap between them extending in toward the bearing. A bearing-protecting packing arrangement at the entrance of the gap includes an annular groove, concentric with the bore, defined on the surface on the outer component in the vicinity of the bore and leading widthwise in toward the bore and a complementary annular ring fixed on the surface of the axle component in the vicinity of the bore. The annular ring cooperates with and projects into the groove so as to substantially prevent foreign elements from entering the gap and contaminating the bearing in the bore.

3 Claims, 1 Drawing Figure

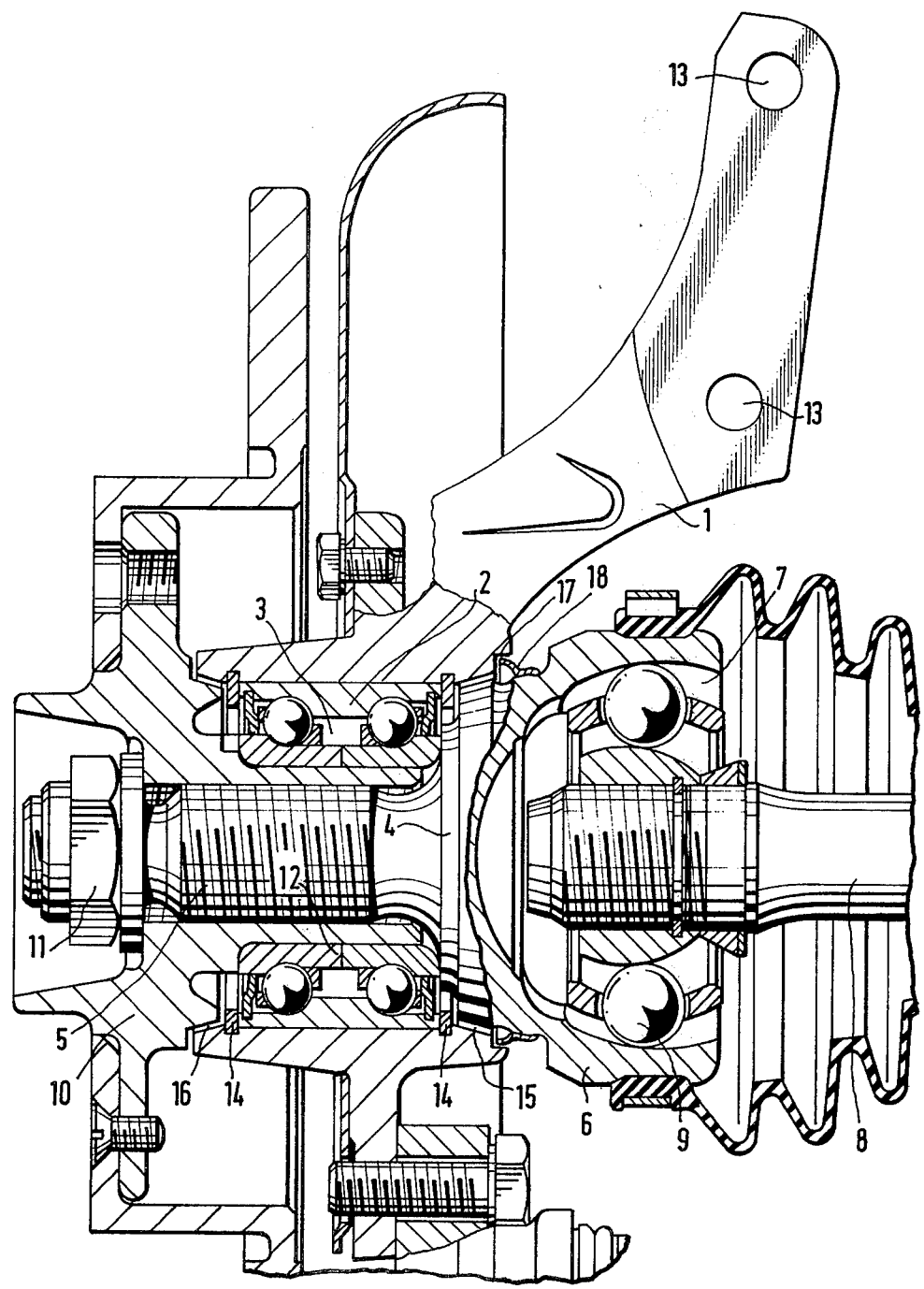

BEARING ARRANGEMENT FOR A VEHICLE WHEEL

BACKGROUND OF THE INVENTION

A common bearing arrangement for a vehicle wheel consists of an outer component provided with a bore within which an inner axle component is journalled, supported on a bearing. Depending on whether the wheel is freewheeling or driven, either the outer or the axle component, respectively, is connected with the vehicle wheel for rotation. Relative support for the rotating component is obtained with the help of either several roller bearings, e.g., as shown in German Utility Model No. 33,830 or U.S. Pat. No. 3,597,000, or a single multiple-row roller bearing, e.g., as shown in German Published Patent Application No. 1,915,932 or German Public Disclosure No. 1,902,942. Inasmuch as the wheel bearing can be smaller when a single multiple-row roller bearing is employed, especially for driven vehicle wheels, such multiple-row roller bearings are increasingly preferred.

Bearing-protecting packing devices customarily used in known bearing arrangements are comparatively costly. For example, expensive labyrinth packings are used, such as in U.S. Pat. No. 3,597,000 or German Utility Model No. 33,830, for example, which apply themselves against the axle as well as the frame component. It is evident that these labyrinth packings, which preferably are fabricated of elastomer material, are subject to wear and tear and must be occasionally changed. Moreover, a certain degree of accuracy in dimensioning is required so as to ensure faultless seating of the packing.

In the known bearing arrangement for a driven vehicle wheel disclosed in German Published Patent Application No. 1,915,932, the packing for protecting the roller bearing is similarly applied to the outer as well as the axle component. Further, this type of packing is required to be in very close contact with both the outer and axle components in order to safely prevent even the slightest soiling of the roller bearing, because it is designed as a throw-away unit and the bearing itself cannot be changed. The usability of the bearing arrangement is dependent both upon the accuracy of manufacture and the resistance of the packing to wear.

SUMMARY OF THE INVENTION

It is therefore the purpose of invention to provide a bearing-protecting packing arrangement for a wheel bearing of the aforementioned kind which is distinguished by an especially simple construction and ensures that the wheel bearing is substantially protected from the penetration of foreign elements, such as water, especially when the vehicle is not moving.

In accordance with the invention, a bearing arrangement for a vehicle wheel has an outer component provided with a bore and an inner axle component journalled in the bore and supported therein by means of a bearing, the exterior surfaces of the components in the vicinity of the bore defining a gap between them extending in toward the bearing. An annular groove, concentric with the bore, defined at the entrance of the gap on the surface of the outer component is provided with an undercut, and a complementary slinger ring, having a cross-section generally resembling a tapering trapezoid or the cross-section of a truncated cone, is fixed in the gap area on the axle component and projects into the undercut groove with its widening portion.

By this simple construction, whose manufacture does not demand any special working tolerances, it is ensured in a simple manner that water dripping down from the outer component is diverted from the bearing gap and flows down outside of the gap onto the axle component. This construction thus substantially prevents penetration of water through the bearing gap into the bearing between the outer and axle components so that the risk of corrosion is substantially decreased.

BRIEF DESCRIPTION OF THE PREFERRED EMBODIMENT

The invention is described in detail below in conjunction with the drawing, which shows an elevational schematic view in cross-section of a wheel bearing arrangement according to the invention. The wheel bearing illustrated consists of an outer component 1 in the form of a swivel bearing provided with a bore (not numbered) accommodating the outer race 2 of a multi-row roller bearing 3. An inner axle component 4 is rotatably supported by the roller bearing 3 in the bore and includes a splined axle journal 5 and a ganged rigid coupling joint 6. Tracks 7 cooperating with the spheres 9 of the ganged coupling joint are arranged for transmitting the torques of the driving half sheet 8. A wheel hub 10 has a sleeve portion fitting over the axle journal 5 and is secured thereto by means of a nut and bolt connection 11. The inner race 12 of the roller bearing 3 supports the wheel hub 10 which is fastened in a known manner to a vehicle wheel, not shown in the drawing. The outer component 1 is provided with several apertures 13 so that a wheel guiding element, e.g., a suspension strut or spring leg, can be coupled to it.

The outer race 2 of the roller bearing 3 is fixed in the bore of the outer component 1 by means of two retaining rings 14. The inner race 12 of the roller bearing is held between an abutting shoulder (not numbered in the drawing) of the inner axle component 4 and a similar abutment on the wheel hub 10. Between the outer component and the inner axle component, as well as between the outer component and the wheel hub, are defined bearing gaps 15 and 16, respectively, which lead into the roller bearing 3. The bearing gap 16, defined in part by the wheel hub 10, is largely protected from the penetration of dirt and water by the brake disc (not numbered in the drawing) and the vehicle wheel.

However, this is not true of the bearing gap 15 in the vicinity of the coupling joint 6. Here the danger that dirt and especially water will penetrate the bearing gap and reach the roller bearing 3 is rather great, especially if the length of the bearing gap 15 is comparatively short. In order to prevent the introduction of dirt and water into the bearing gap 15, a sealing or packing arrangement is provided at the entrance of the gap. The packing device includes a circular groove 17, defined in the outer component 1, which has its start at the surface facing the ganged coupling joint of the axle component 4 and leads along one side of the gap toward the bearing bore. In accordance with the invention, the circular groove 17 has an undercut or back taper of several degrees, i.e., the diameter of the groove is larger nearer the bearing bore than on the surface of the outer component. On the ganged coupling joint 6 of the inner axle component is fixed a slinger ring 18 generally having a tapering trapezoidal cross-section, such as the cross-section of a truncated cone. The widening portion of the slinger ring, in accordance with the invention, projects into the back-tapered groove 17. The slinger ring may consist of metal or plastics and can be rolled or pressed onto the ganged rigid coupling joint of the inner axle component 4.

By means of the proposed measures, a sealing device is obtained which from outward appearance seems insignificant, but is actually very effective in operation. The slinger ring rigidly mounted on the ganged coupling joint 6 is effective not only when rotating, but even when the vehicle is standing. It safely deflects any water from penetrating the bearing gap and thereby contaminating the roller bearing. The proposed measures result in the formation of a drip-off edge at the entrance of the bearing gap 15, such that, especially when the vehicle is standing, drops of water dripping from the outer component onto the ganged rigid coupling joint of the inner axle component are diverted by the truncated cone-like slinger ring from the bearing gap and flow outside onto the ganged coupling joint. Accordingly, the risk of corrosion of the roller bearing is greatly reduced.

In the invention, it is especially advantageous not only that the sealing or packing device be outstandingly effective, but also that it be of simple and inexpensive construction. The bearing-protecting packing described above can be incorporated into the wheel bearing arrangement when the individual parts thereof are produced. The groove provided with the undercut can be formed in the outer component when it is machined, and the slinger ring can be pressed on when the inner axle component is produced. Thus, when the wheel bearing is assembled, the packing device is obtained without any additional assembly or adjustment. However, the dimensions of the back-tapered groove and the slinger ring must be designed to fit each other.

It will be understood that the above described embodiment is merely exemplary and that persons skilled in the art may make variations and modifications without departing from the spirit and scope of the invention. For example, the described embodiment is for a driven wheel bearing arrangement wherein the inner axle component 4 rotates and the outer component 1 is stationary. Of course, the invention may be similarly applied with equal advantage to wheel bearings in which the inner axle component is stationary and the outer component rotates together with the vehicle wheel attached to it. All such modifications and variations are intended to be within the scope of the invention as defined in the appended claims.

I claim:

1. An improved bearing arrangement for a vehicle wheel, particularly of an automobile, having in combination an outer component provided with a bore and an inner axle component journalled in the bore and supported therein by means of a bearing, whereby one of the components is connected to a wheel for the vehicle and the other component is connected to wheel guiding elements articulated on the vehicle body, the surfaces of said components in the vicinity of the bore defining a gap between them extending in toward the bearing, wherein the improvement comprises a bearing-protecting packing arrangement at an entrance of the gap which includes an annular groove, concentric with the bore, defined on the surface of the outer component in the vicinity of the bore and leading widthwise in toward the bore and a complementary annular slinger ring fixed on the surface of the inner axle component in the vicinity of the bore, said annular ring cooperating with and projecting into the groove so as to substantially prevent foreign elements from entering the gap and contaminating the bearing in the bore.

2. The improved bearing arrangement described in claim 1, wherein the bearing is a roller bearing.

3. The improved bearing arrangement described in claim 1, wherein the groove is undercut with a back taper, and the ring generally has a tapering trapezoidal cross-section, such as the cross-section of a truncated cone, and is arranged such that a widening portion thereof projects into the back taper of the undercut groove.

* * * * *

UNITED STATES PATENT AND TRADEMARK OFFICE
CERTIFICATE OF CORRECTION

PATENT NO. : 4,010,986

DATED : March 8, 1977

INVENTOR(S) : Heinz Otto

It is certified that error appears in the above-identified patent and that said Letters Patent are hereby corrected as shown below:

First page, line 13 of ABSTRACT, "surface on" should read --surface of--;
Column 1, line 15, "33,830" should read --71 33,830--;
Column 1, line 27, "33,830" should read --71 33,830--;
Column 2, line 27, "sheet" should read --shaft--.

Signed and Sealed this

Seventeenth Day of May 1977

[SEAL]

Attest:

RUTH C. MASON
*Attesting Officer*

C. MARSHALL DANN
*Commissioner of Patents and Trademarks*